United States Patent
Kim et al.

(10) Patent No.: US 11,287,516 B2
(45) Date of Patent: Mar. 29, 2022

(54) SPATIAL LIGHT MODULATOR AND BEAM STEERING APPARATUS INCLUDING THE SAME

(71) Applicant: SAMSUNG ELECTRONICS CO., LTD., Suwon-si (KR)

(72) Inventors: Sunil Kim, Osan-si (KR); Junghyun Park, Seoul (KR); Duhyun Lee, Yongin-si (KR); Byunggil Jeong, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/927,476

(22) Filed: Jul. 13, 2020

(65) Prior Publication Data

US 2021/0208256 A1 Jul. 8, 2021

(30) Foreign Application Priority Data

Jan. 3, 2020 (KR) .................. 10-2020-0001017

(51) Int. Cl.
*G01S 7/481* (2006.01)
*G02F 1/29* (2006.01)
*G01S 17/931* (2020.01)

(52) U.S. Cl.
CPC .......... *G01S 7/4817* (2013.01); *G01S 17/931* (2020.01); *G02F 1/292* (2013.01)

(58) Field of Classification Search
CPC ....... G01N 21/49; G02F 1/295; G02F 1/2955; G02F 1/292; G02B 6/125; G02B 6/1225; G02B 6/124; G02B 6/34; G02B 2006/12107; G01S 7/4817; G01S 17/931
See application file for complete search history.

(56) References Cited

U.S. PATENT DOCUMENTS

| 6,782,164 B1* | 8/2004 | Lee .................. G02B 6/124 372/20 |
| 2013/0235890 A1* | 9/2013 | Creazzo ............... H01S 5/1007 372/20 |
| 2016/0064894 A1* | 3/2016 | Takiguchi .......... G02F 1/13439 372/26 |
| 2018/0196137 A1* | 7/2018 | Lee ...................... G02F 1/292 |
| 2018/0196138 A1* | 7/2018 | Lee ...................... G01S 7/481 |

(Continued)

FOREIGN PATENT DOCUMENTS

| JP | 2004077912 A | 3/2004 |
| KR | 1020100017785 A | 2/2010 |
| KR | 1020190003111 A | 1/2019 |

OTHER PUBLICATIONS

Horie, Y., et al., "High-speed, phase-dominant spatial light modulation with silicon-based active resonant antennas", ACS Photonics, Nov. 8, 2017, pp. 1-18 (19 pages) available at pubs.acs.org.

(Continued)

*Primary Examiner* — Luke D Ratcliffe
(74) *Attorney, Agent, or Firm* — Sughrue Mion, PLLC

(57) ABSTRACT

A spatial light modulator and a beam steering apparatus including the same are provided. The spatial light modulator may include a distributed Bragg reflector provided on a substrate, a cavity provided on the distributed Bragg reflector, a grating reflector provided on the cavity, and a heater provided on the grating reflector.

17 Claims, 13 Drawing Sheets

(56) References Cited

U.S. PATENT DOCUMENTS

| | | |
|---|---|---|
| 2018/0217554 A1 | 8/2018 | Kroll et al. |
| 2019/0004394 A1* | 1/2019 | Shin et al. |
| 2019/0033522 A1* | 1/2019 | Baba ..................... G01N 21/49 |
| 2021/0018767 A1* | 1/2021 | Peng ..................... B82Y 20/00 |

OTHER PUBLICATIONS

Koyama, F., et al., "Beam Steering, Beam Shaping, and Intensity Modulation Based on VCSEL Photonics", IEEE Journal of Selected Topics in Quantum Electronics, vol. 19, No. 4, Jul./Aug. 2013, 10 pages.

* cited by examiner

SPATIAL LIGHT MODULATOR AND BEAM STEERING APPARATUS INCLUDING THE SAME

CROSS-REFERENCE TO RELATED APPLICATION

This application claims priority from Korean Patent Application No. 10-2020-0001017, filed on Jan. 3, 2020, in the Korean Intellectual Property Office, the disclosure of which is herein incorporated by reference in its entirety.

BACKGROUND

1. Field

Example embodiments of the disclosure relate to a spatial light modulator capable of increasing beam steering speed and a beam steering apparatus including the same

2. Description of the Related Art

An Advanced Driving Assistance System (ADAS) with various functions is commercially available. For example, vehicles equipped with functions, such as Adaptive Cruise Control (ACC) and Autonomous Emergency Braking System (AEB), are increasing trends.

The ACC is a vehicle driving function that recognizes the position and speed of another vehicle, such that the speed is reduced when there is a risk of collision and the vehicle is driven within the set speed range when there is no risk of collision. The AEB is a vehicle driving function that recognizes vehicles ahead and prevents collisions by automatically operating a brake when a driver does not respond to the risk of a collision or if the response is inappropriate. Also, autonomous driving vehicles are expected to be commercialized in the near future.

Accordingly, there is an increasing interest in an optical measuring device that provides information about the surroundings of the vehicle. For example, a vehicle with light detection and ranging (LiDAR) may irradiate a laser to a selected area around the vehicle and detect the reflected laser to provide a distance, a relative speed, and an azimuth angle with an object around the vehicle. To this regard, the vehicle LiDAR includes a beam steering apparatus capable of steering light in a desired area.

Beam steering apparatuses are largely classified into mechanical beam steering apparatuses and non-mechanical beam steering apparatuses. For example, a mechanical beam steering apparatus may be operated by a method of rotating the light source itself, a method of rotating a mirror that reflects light, a method of moving a spherical lens in a direction perpendicular to an optical axis, and the like. In addition, a non-mechanical beam steering apparatus may be operated by a method using a semiconductor device, a method of electrically controlling the angle of the reflected light using a reflective phased array, and the like.

SUMMARY

One or more example embodiments provide a spatial light modulator capable of increasing beam steering speed.

One or more example embodiments provide a system including a beam steering apparatus capable of increasing beam steering speed.

Additional aspects will be set forth in part in the description which follows and, in part, will be apparent from the description, or may be learned by practice of the example embodiments of the disclosure According to an aspect of an example embodiment, there is provided a spatial light modulator including: a substrate; a distributed Bragg reflector provided on the substrate; a cavity provided on the distributed Bragg reflector; a grating reflector provided on the cavity; and heaters spaced apart from each other and respectively arranged corresponding to pixels, the heaters being provided on the grating reflector, wherein a refractive index of the grating reflector is controlled by heat supplied from a corresponding heater.

The spatial light modulator may further include a spacer layer provided between the heaters and the grating reflector.

The spacer layer may have a thickness in a range of 200 nm to 1000 nm.

The spacer layer may include a dielectric.

The spacer layer may include $SiO_2$.

The grating reflector may include silicon.

The distributed Bragg reflector may have a structure in which a first layer and a second layer are alternately stacked, the first layer and the second layer respectively including one of Si, $Si_3N_4$, $SiO_2$, and $TiO_2$.

The heaters may include at least one of W, TiN, and NiCr.

The spatial light modulator may further include a nanostructure provided between the substrates and the distributed Bragg reflector.

The nanostructure may include at least one of Si, Ge, SiGe, GaAs, $Si_3N_4$, $TiO_2$, GaP, and InSb.

The spatial light modulator may further include a trench provided between the heaters.

The spatial light modulator may further include a trench penetrated to the spacer layer between the heaters.

According to an aspect of an another example embodiment, a beam steering apparatus may include a light source for irradiating light; a spatial light modulator for controlling the progression direction of the light irradiated by the light source and irradiating the controlled light onto an object; a photodetector for detecting light reflected from the object; and a controller for controlling the spatial light modulator, wherein the spatial light modulator includes a substrate, a distributed Bragg reflector provided on the substrate, a cavity provided on the distributed Bragg reflector, a grating reflector provided on the cavity, and heaters spaced apart from each other and respectively arranged corresponding to pixels, the heaters being provided on the grating reflector, wherein a refractive index of the grating reflector is controlled by heat supplied from a corresponding heater.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
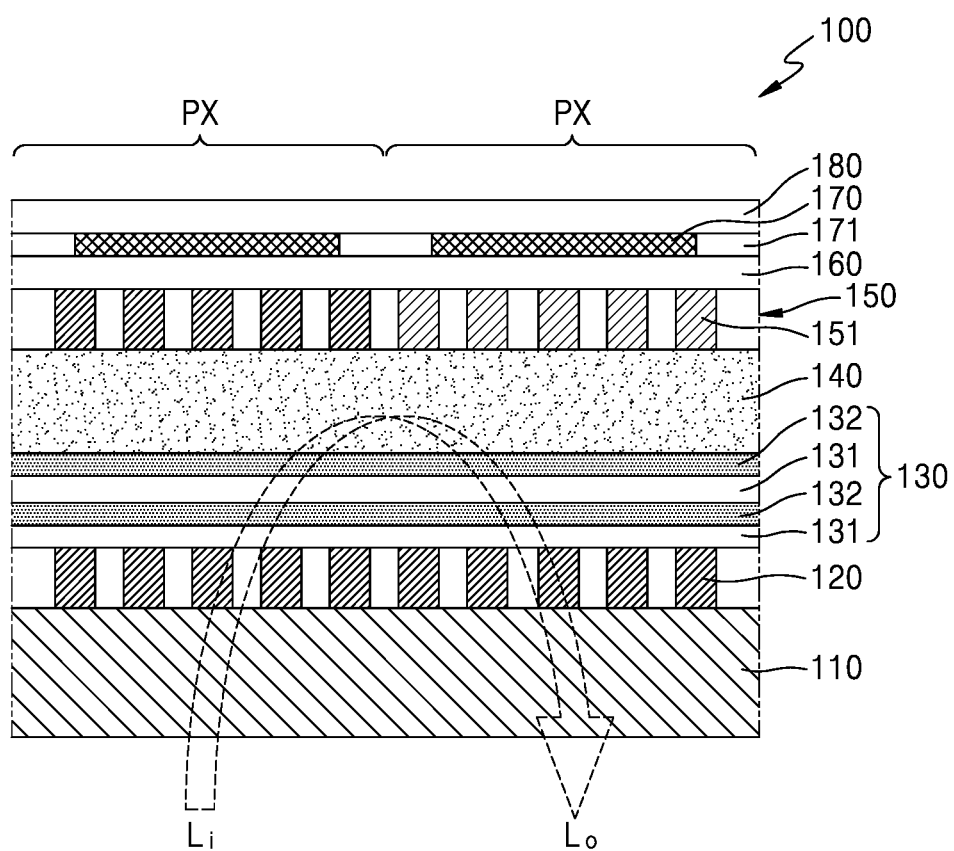
FIG. 1 illustrates a cross-sectional view of a spatial light modulator according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression "at least one of" a, b, and c, should be understood as including only a, only b, only c, both a and b, both a and c, both b and c, or all of a, b, and c.

Hereinafter, a spatial light modulator and a beam steering apparatus including the same according to various example embodiments will be described in detail with reference to the accompanying drawings. In the drawings, like reference numerals refer to like elements, and a size of each element in the drawings may be exaggerated for clarity and convenience of description. The terms "first", "second", and the like may be used to describe various configuration elements, but configuration elements should not be limited by the terms. The terms are only used to distinguish one configuration element from another configuration element.

A singular expression includes multiple expressions unless the context clearly indicates otherwise. In addition, when a part is described to "include" a certain configuration element, which means that the part may further include other configuration elements, except to exclude other configuration elements unless otherwise stated. In addition, the size or thickness of each component in the drawings may be exaggerated for clarity of description. Also, when a given layer of material is described as being on a substrate or other layer, the material layer may be in direct contact with the substrate or another layer, and another third layer may be present therebetween. In addition, in the examples below, the materials forming each layer are example, and other materials may be used.

In addition, a term " . . . unit", " . . . module", or the like described in the specification means a unit for processing at least one function or operation, which may be implemented by hardware or software, or a combination of the hardware and the software.

Specified implementations described in the example embodiment are given only as examples, and do not limit the technical scope in any way. For conciseness of description, descriptions of conventional electronic configurations, control systems, software, and other functional aspects of the systems may be omitted. In addition, the connection or connection members of the lines between the components shown in the drawings are illustrative of the functional connection and/or physical or circuit connections as an example, may be represented as a replaceable or additional various functional connections, physical connection, or circuit connections in the practical device.

A term "above-described" and similar terminology may be used for the singular and the plural.

Unless explicitly stated that the steps constituting the method should be in the order described, they may be performed in a proper order. In addition, the use of all example terms (e.g., etc.) is merely for the purpose of describing the technical ideas in detail, and the scope of rights is not limited to these terms unless limited by the claims.

FIG. 1 illustrates a spatial light modulator according to an example embodiment.

A spatial light modulator 100 may include a substrate 110, a distributed Bragg reflector 130 provided on the substrate 110, a cavity 140 provided on the distributed Bragg reflector 130, a grating reflector 150 provided on the cavity 140, and a heater 170 provided on the grating reflector 150. The spatial light modulator 100 may modulate and then output a phase of incident light Li to adjust a progression direction of emitted light Lo. The spatial light modulator 100 may comprise a plurality of pixels PX. The pixel PX may be a unit capable of independently driving the spatial light modulator 100. Alternatively, the pixel PX may represent a basic unit capable of independently modulating the phase of light.

The substrate 110 may be a transparent substrate that transmits light. For example, the substrate 110 may be a silicon substrate or a glass substrate. However, the substrate 110 according to the disclosure is not limited thereto.

Figure 2:
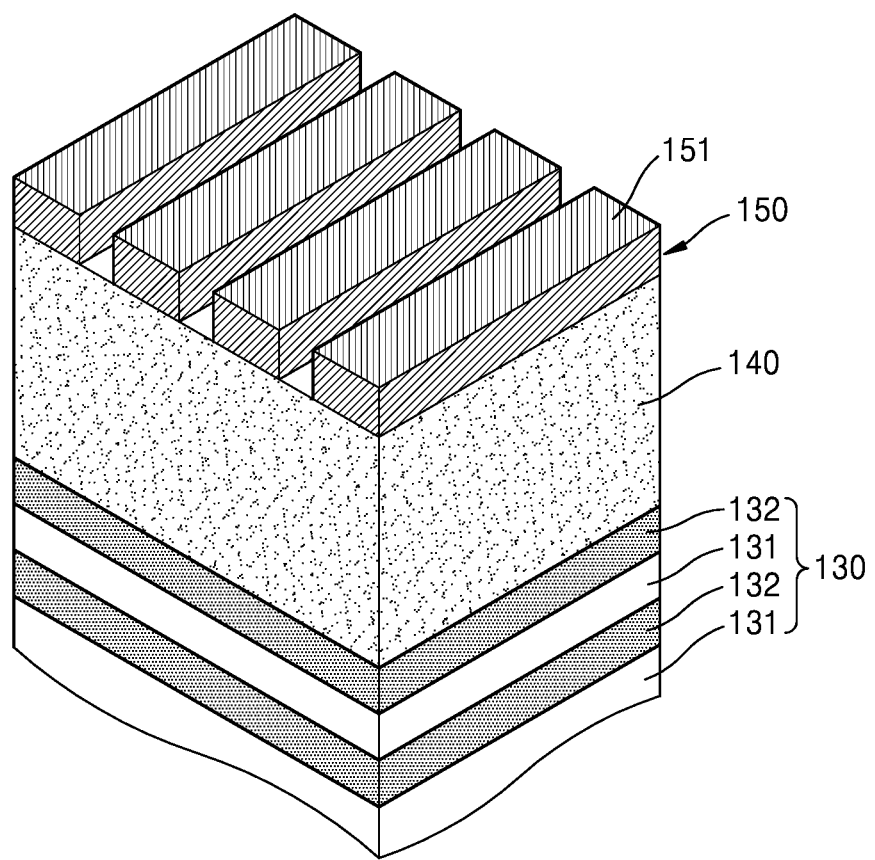
FIG. 2 is a partially enlarged perspective view of the spatial light modulator of FIG. 1.

FIG. 2 is a three-dimensional enlarged view of the distributed Bragg reflector 130, the cavity 140, and the grating reflector 150 in one pixel PX for convenience of description.

The distributed Bragg reflector 130 may include a first layer 131 and a second layer 132 having different refractive indices alternately stacked a plurality of times. Due to the difference in a refractive index, interference may occur in all of reflected waves at the interface of each layer. The distributed Bragg reflector 130 may have a structure in which two layers selected from Si, $Si_3N_4$, $SiO_2$, and $TiO_2$ are alternately stacked. For example, the distributed Bragg reflector 130 may have a structure in which an $Si_3N_4$ layer and an $SiO_2$ layer are alternately stacked. The light reflectivity may be controlled by the thickness of the two layers and the number of stacked layers in the distributed Bragg reflector 130.

The cavity 140 may include $SiO_2$, for example. The resonance wavelength of incident light may be determined according to the thickness of the cavity 140. The thicker the cavity 140, the longer the resonance wavelength of the light. The thinner the thickness of the cavity 140, the shorter the resonance wavelength of the light.

The grating reflector 150 may be arranged with the gratings 151, and the gratings 151 may be spaced apart from each other at predetermined intervals. The reflection and transmission of light may be controlled by adjusting the separation distance, height, and width of the grating 151. The grating 151 may have a larger refractive index than the surrounding material. The grating reflector 150 may include, for example, silicon (Si).

As light is repeatedly reflected between the distributed Bragg reflector 130 and the grating reflector 150, light having a specified phase may be output. The specified phase of the light may be controlled by the heat input through the heater 170. Incident light Li passing through the substrate 110 is transmitted through the distributed Bragg reflector 130, propagates to the cavity 140 and then reflected by the grating reflector 150. The incident light may be trapped and resonated in the cavity 140 between the distributed Bragg reflector 130 and the grating reflector 150, and then may be emitted through the distributed Bragg reflector 130. The refractive index of the grating reflector 150 is varied by the heat applied by the heater 170, and the resonance characteristic of the light is changed according to the variation of the refractive index, so that the phase of the light emitted to the outside may be controlled. In addition, the reflectivity of the grating reflector 150 may be controlled by the heat transferred from the heater 170.

Figure 3:
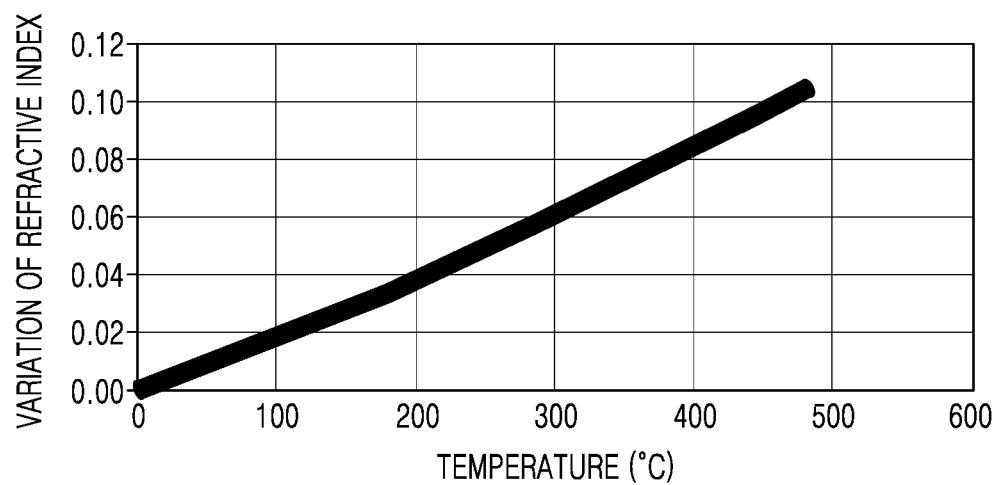
FIG. 3 is a graph showing a variation in a refractive index of a grating reflector according to a temperature of a heater of a spatial light modulator according to an example embodiment.

FIG. 3 is a graph illustrating a variation in a refractive index of the grating reflector 150 according to a temperature of the heater 170. According to FIG. 3, the refractive index varies nearly linearly according to the temperature of the heater 170. The temperature range by the heater may range from 20° C. to 500° C., for example. With a temperature range of 20° C. to 500° C., the phase shift may be adjusted with the variation in the refractive index of the grating reflector 150.

Figure 4:
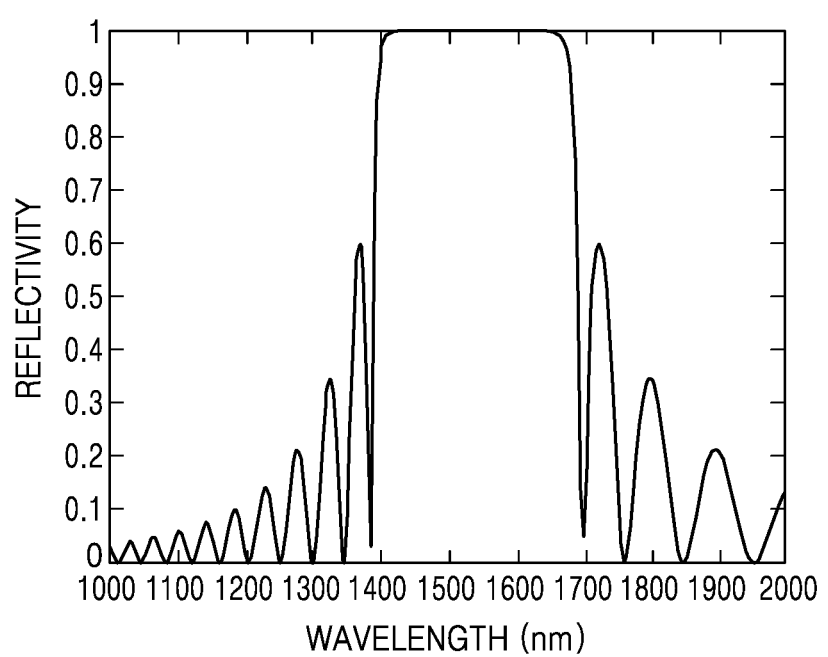
FIG. 4 illustrates a reflection spectrum of a distributed Bragg reflector of a spatial light modulator according to an example embodiment.

FIG. 4 shows the reflection spectrum of the distributed Bragg reflector 130. The reflection spectrum of light shows the reflectivity according to the wavelength of light. Here, the distributed Bragg reflector 130 may have a structure of 20 of stacked pairs of $SiN_4$ and $SiO_2$, where the pair of $SiN_4$ and $SiO_2$ is stacked with $SiN_4$ and $SiO_2$ in thicknesses of 195 nm and 260 nm, respectively. Referring to FIG. 4, a high reflectivity close to approximately 1 appears near the 1550 nm wavelength.

Figure 5:
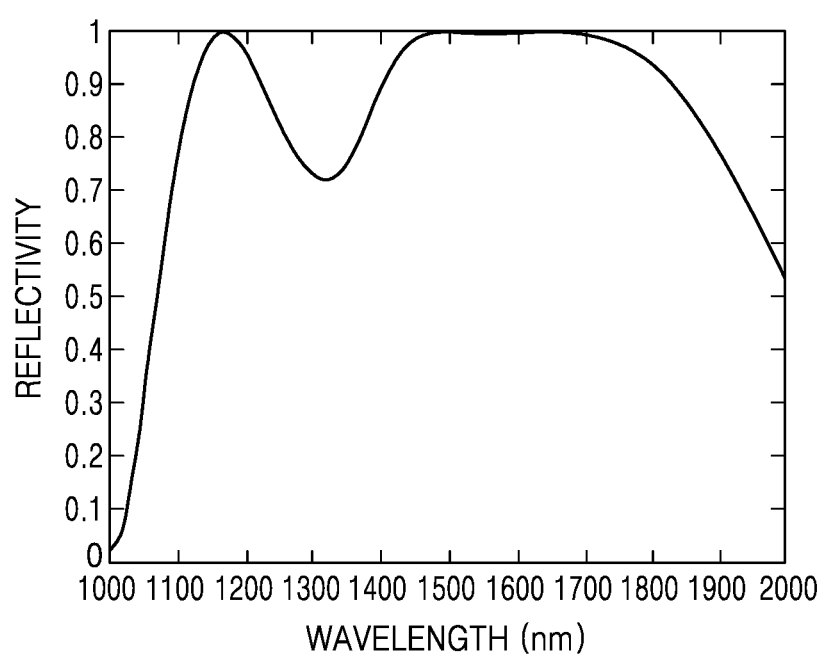
FIG. 5 illustrates a reflection spectrum of a grating reflector of a spatial light modulator according to an example embodiment.

FIG. 5 shows a reflection spectrum of the grating reflector 150. Here, the period of the grating arrangement is 675 nm, the width of the grating is 430 nm, the height of the grating is 435 nm, and the material of the grating may be Si. The cavity may include $SiO_2$. The polarization is assumed to have a direction perpendicular to the grating, and the incident angle of light is assumed to be 0 degrees. Referring to FIG. 5, high reflectivity is shown in the wavelength range of 1500 nm to 1700 nm. The grating reflector 150 may be configured to have a high reflectivity in various wavelength bands by adjusting at least one of an arrangement period, a height, and a width of the grating reflector 150.

Hereinafter, a method of adjusting the reflection phase according to the temperature in the pixel of the spatial light modulator according to an example embodiment will be described.

The refractive index of the grating reflector 150 may vary according to the following equation. For example, the material of the grating may be Si.

$$\frac{dn}{dT} = 8.61 \times 10^{-5} + 3.63 \times 10^{-7} T - 2.07 \times 10^{-10} T^2 \ [K^{-1}] \qquad \text{<Equation 1>}$$

Here, T represents temperature and n represents the refractive index of Si. According to Equation 1, when the temperature changes by about 300 degrees, the refractive index of Si changes by about 0.1.

When the refractive index of Si changes, the reflection phase of the grating reflector 150 changes, which causes the resonance wavelength to change. As a result, the operation wavelength deviates from the resonance wavelength. This is called detuned resonance. By using detuned resonance, the reflection phase may be adjusted.

In the spatial light modulator according to an example embodiment, the heater 170 may be above the spatial light modulator 100. Because the heater 170 is above the spatial light modulator, heat generated from the heater 170 may be quickly discharged to the outside. Therefore, the temperature control easily increases the driving speed of the spatial light modulator 100. In other words, since the heat may be quickly discharged to the outside, the heater 170 may quickly raise or lower the temperature for each pixel PX. In addition, since heat is released quickly, the influence of heat on neighboring pixels PX may be reduced, thereby reducing thermal crosstalk between neighboring pixels. As a result, phase modulation is independently performed for each pixel, and the accuracy of adjusting the progression direction of the light according to the phase modulation may be improved.

The heater 170 may include at least one of W, TiN, and NiCr, for example. However, it is not limited thereto. The heaters 170 may be arranged to be apart from each other for each pixel PX. Between the heaters 170, a dielectric 171 may be filled. Dielectric 171 may include $SiO_2$, for example. The size of the heater 170 may be smaller than the size of the pixel. The size of the heater 170 may be changed considering the thermal conductivity of the heater 170 and the thermal crosstalk between neighboring pixels. The phase of the light may be modulated by applying heat to each pixel PX through the heater 170. The spatial light modulator 100 may modulate the phase of the incident light Li for each pixel PX to adjust the progression direction of emitted light Lo.

A spacer layer 160 may be further provided between the heater 170 and the grating reflector 150. The spacer layer 160 may include a dielectric. The spacer layer 160 may include, for example, $SiO_2$. The spacer layer 160 may control the efficiency of heat applied by the heater 170 to the grating reflector 150. The spacer layer 160 may have a thickness in a range of 200 nm to 1000 nm, for example. When the thickness of the spacer layer 160 is less than 200 nm, the reflectivity of the grating reflector 150 is too small, and when the thickness of the spacer layer 160 is greater than 1000 nm, the efficiency of heat transfer may be reduced. When the spacer layer 160 has a thickness in a range of 200 nm to 1000 nm, the refractive index of the grating reflector 150 may be appropriately adjusted.

A heat dissipation plate 180 may be further provided on the heater 170. The heat dissipation plate 180 may be a layer for dissipating heat from the heater 170 and protecting the heater 170. The heat dissipation plate 180 may include $SiO_2$, for example.

Referring to FIG. 1, nanostructures 120 may be provided between the substrate 110 and the distributed Bragg reflector 130.

The nanostructures 120 may include a structure of a nanoscale size. The nanostructures 120 may include, for example, a pillar-shaped structure. Nanostructures may be, for example, cylinders. The nanostructures 120 may include a nanostructure array in a region corresponding to the pixel PX of the spatial light modulator 100. For example, the nanostructures 120 may have a different nanostructure array for each pixel. The nanostructures 120 may differ in at least one of the size of a nanopillar, the number of nanopillars, the shape of nanopillars, and spacing of the nanostructure arrays for each pixel. The nanopillars in the nanostructures 120 may be arranged periodically, or non-periodically. The array of nanostructures may be designed for each pixel. In other words, the nanostructures 120 may include the array of nanostructures designed to have a specified function for each pixel PX. Moreover, in FIG. 1, the nanostructures 120 are provided between the substrate 110 and the distributed Bragg reflector 130, but may be provided on the lower surface of the substrate 110. The nanostructures 120 may have the size of sub wavelength scale. The nanostructures 120 may have sizes in a range of 50 nm to 1500 nm, for example. The nanostructures 120 may have sizes in a range of 300 nm to 320 nm, for example, and an array pitch of the nanostructures may be 710 nm, for example. However, the size of the nanostructures 120 is not limited thereto and may vary.

Figure 6:
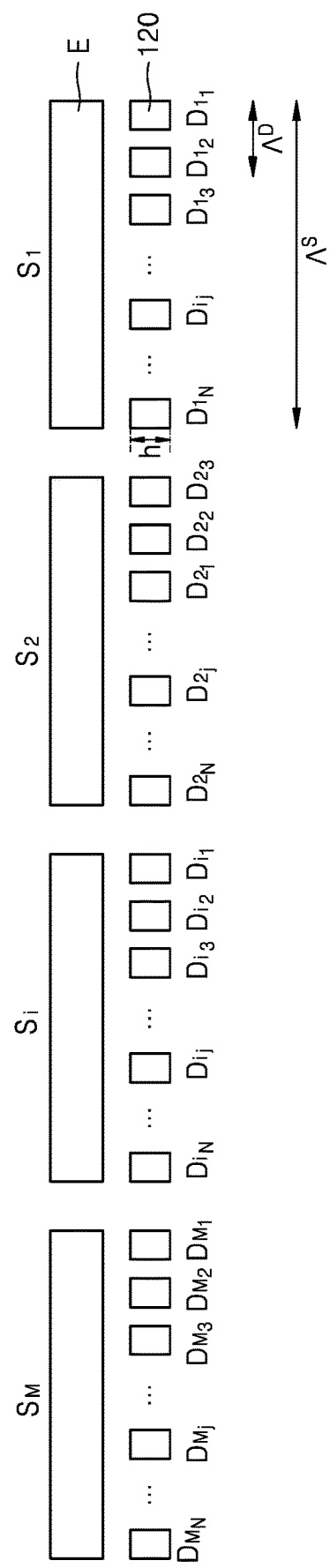
FIG. 6 shows a one-dimensional nanostructure array according to an example embodiment.

FIG. 6 shows a one-dimensional array of nanostructures in each pixel. In FIG. 6, components E on the nanostructures 120 corresponding to each pixel are shown as one box for convenience. Referring to FIGS. 1 and 6, the components E may include the distributed Bragg reflector 130, the cavity 140, the grating reflector 150, and the heater 170. A first pixel S1, a second pixel S2, . . . , and an M-th pixel SM are provided. For example, the first pixel S1 is provided with the components E and the nanostructures 120 arranged correspondingly thereto. It is assumed that the number of nanostructures in each pixel is N, the spacing between neighboring nanostructures is represented as $\Lambda_D$, and the pitch between neighboring pixels is represented as $\Lambda_S$. In FIG. 6, the spacing between nanostructures is constant, and $\Lambda_S$ is the product of N and $\Lambda_D$.

The nanostructures 120 may include dielectric materials with a relatively high refractive index. The nanostructures 120 may include a dielectric material with a refractive index in a range of 1.9 to 4.0, for example. The nanostructures 120 may include at least one selected from the group including Si, Ge, SiGe, GaAs, $Si_3N_4$, $TiO_2$, GaP, and InSb, for example, or a combination thereof.

Assuming that the wavelength of the light used by the spatial light modulator 100 is λ and the refractive index of the nanostructures 120 is n, the array spacing $\Lambda_D$ of the nanostructures 120 may be in a range of (λ/2n) to (5λ/2n). In addition, assuming that the wavelength of the light used by the spatial light modulator 100 is λ and the refractive index of the nanostructure 120 is n, the height h of the nanostructures 120 may be in a range of (3λ/2n) to (7λ/2n). The nanostructures 120 may increase light efficiency by improving transmission characteristics of light. Also, the nanostructures 120 may widen the field of view (FOV) of light. The spatial light modulator 100 according to an example embodiment may change the FOV. For example, the FOV may be adjusted while maintaining the intensity of the light by adjusting the size of the cylinder. The FOV may be controlled by arranging the nanostructures using a combination of the shape, the spacing of the nanostructures, and the size of the nanostructures.

Figure 7:
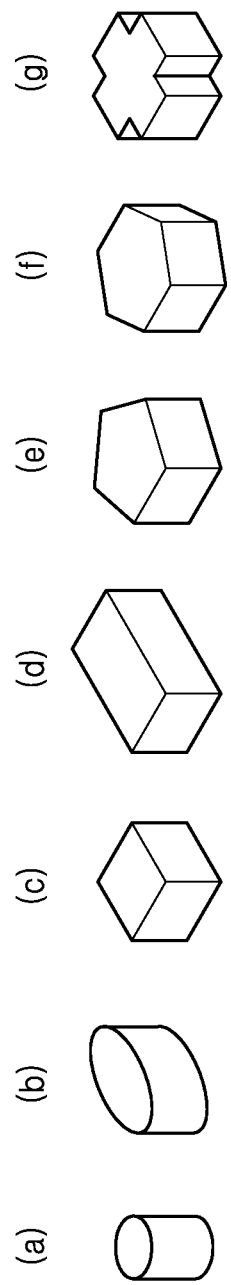
FIG. 7 illustrates various examples of nanostructures included in a spatial light modulator according to example embodiment.

FIG. 7 illustrates various shapes of the nanostructures according to example embodiments.

The nanostructures 120 may be columnar. The nanostructures 120 may be, for example, a cylinder, a polygonal pillar, or a cross pillar (see FIG. 7(g)). The cylinder may have, for example, a cylindrical shape or an elliptical pillar shape, as shown in FIGS. 7(a) and 7(b). The polygonal pillar may have a shape such as a square pillar, a rectangular pillar, a pentagonal pillar, and the like, as shown in FIGS. 7(c) to 7(f), for example. The polygonal pillar is not limited to the examples shown in FIG. 7 and may have various shapes. The shape of the nanostructures may be arranged in various manners for each pixel.

Figure 8:
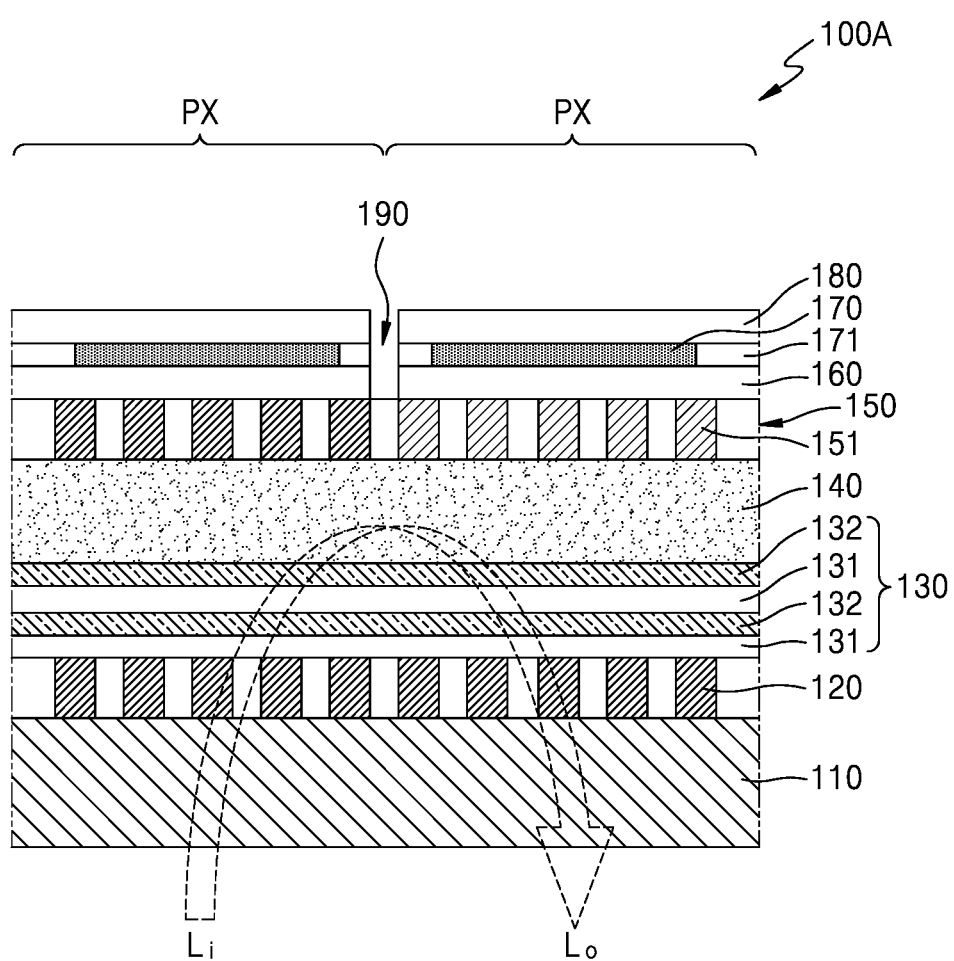
FIGS. 8 and 9 illustrate a spatial light modulator according to another example embodiment.

FIG. 8 illustrates a spatial light modulator according to another example embodiment.

A spatial light modulator 100A further includes a trench 190 in the spatial light modulator 100 shown in FIG. 1. The remaining components are substantially the same as those of the spatial light modulator 100, and thus, a detailed description thereof is omitted. In the spatial light modulator 100A, the trench 190 may be provided between adjacent heaters 170. The trench 190 may be provided between the heaters 170 through the spacer layer 160. The trench 190 may reduce thermal crosstalk by blocking heat generated by the heater 170 from being transferred to the neighboring pixel PX.

Figure 9:
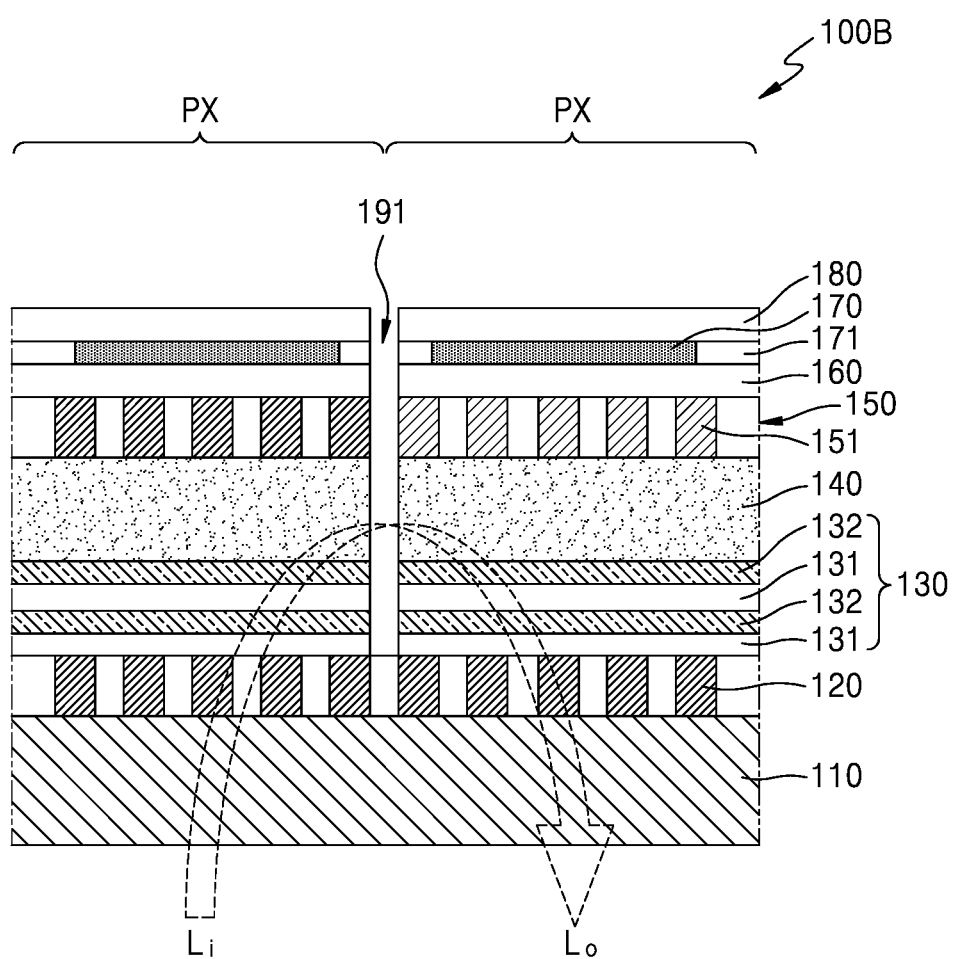

FIG. 9 illustrates a spatial light modulator according to still another example embodiment.

A spatial light modulator 100B further includes a trench 191 in the spatial light modulator 100 shown in FIG. 1. The remaining components are substantially the same as those of the spatial light modulator 100, and thus, a detailed description thereof is omitted. In the spatial light modulator 100B, the trench 191 may be provided between adjacent heaters 170. The trench 191 may be provided between the heaters 170 through the grating reflector 150, the cavity 140, and the distributed Bragg reflector 130. However, the depth of the trench 191 is not limited thereto. The depth of the trench 191 may be variously selected considering an efficiency of blocking heat from being transferred to neighboring pixels, a process of forming a trench, and the like.

The spatial light modulator according to various example embodiments may quickly control the temperature of the spatial light modulator by placing the heater 170 on an upper portion of the spatial light modulator to easily dissipate heat. In addition, the spatial light modulator may rapidly modulate the phase of light through temperature control. In addition, the progression direction of the emitted light may be adjusted through phase modulation of light independently performed at each pixel and synthesis of phase-modulated light. By arranging the spatial light modulator in a matrix form, the progression direction of the light may be adjusted in the horizontal direction and the vertical direction, thereby scanning in three dimensions.

The spatial light modulators according to the various example embodiments described above may be adopted in a beam steering apparatus such as a three-dimensional sensor such as a vehicle LiDAR or a depth sensor used in a three-dimensional camera, for example, to increase accuracy.

Figure 10:
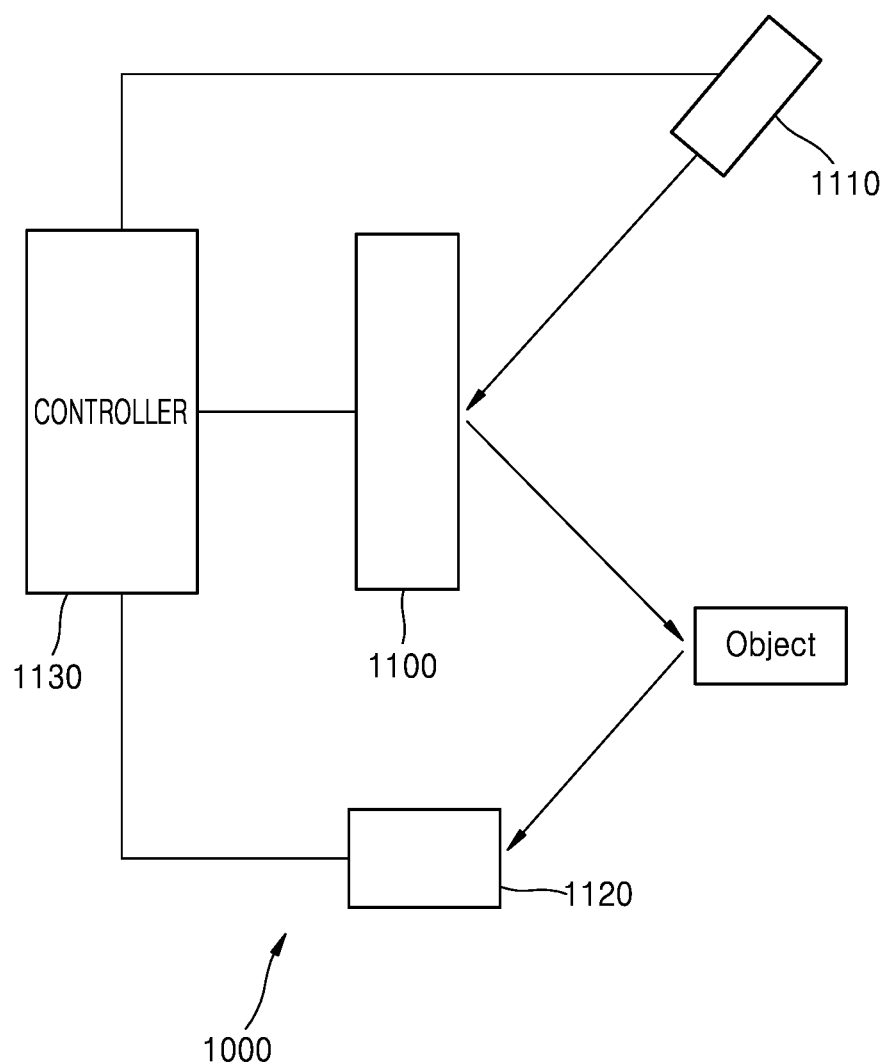
FIG. 10 illustrates a beam steering apparatus including a spatial light modulator according to an example embodiment.

The beam steering apparatus according to various example embodiments may be used in addition to a vehicle LiDAR, a robot LiDAR, a drone LiDAR, an intruder detection system for security, a subway screen door obstacle detection system, a depth sensor, a sensor for facial recognition on a mobile phone, augmented reality (AR), motion recognition and object profiling on TVs or entertainment equipment, or the like FIG. 10 is a block diagram schematically illustrating a configuration of a beam steering apparatus 1000 according to an example embodiment.

Referring to FIG. 10, the beam steering apparatus 1000 according to an example embodiment may include a light source 1110 for irradiating light, a spatial light modulator 1100 for adjusting a progression direction of light incident from the light source 1110, a photodetector 1120 for detecting light reflected from an object after being emitted from the spatial light modulator 1100, and a controller 1130 for controlling the spatial light modulator 1100.

The light source 1110 may include a light source emitting visible light or a laser diode (LD) emitting near infrared rays in a range of about 800 nm to about 1500 nm or a light emitting diode (LED).

The spatial light modulator 1100 may include one or more of the spatial light modulator according to the example embodiments described with reference to FIGS. 1 to 9. The spatial light modulator 1100 modulates a phase by heat for each pixel to adjust a progression direction of the light beam. The spatial light modulator 1100 may scan light with a wide viewing angle.

The controller 1130 may control operations of the spatial light modulator 1100, the light source 1110, and the photodetector 1120. For example, the controller 1130 may control on/off switching of the light source 1110 and the photodetector 1120 and beam scanning operations of the spatial light modulator 1100. In addition, the controller 1130 may calculate information on the object based on the measurement result of the photodetector 1120.

The beam steering apparatus 1000 may periodically irradiate light to one or more areas of the surroundings by using the spatial light modulator 1100 to obtain information about the object at a plurality of locations in the surroundings.

Figure 11:
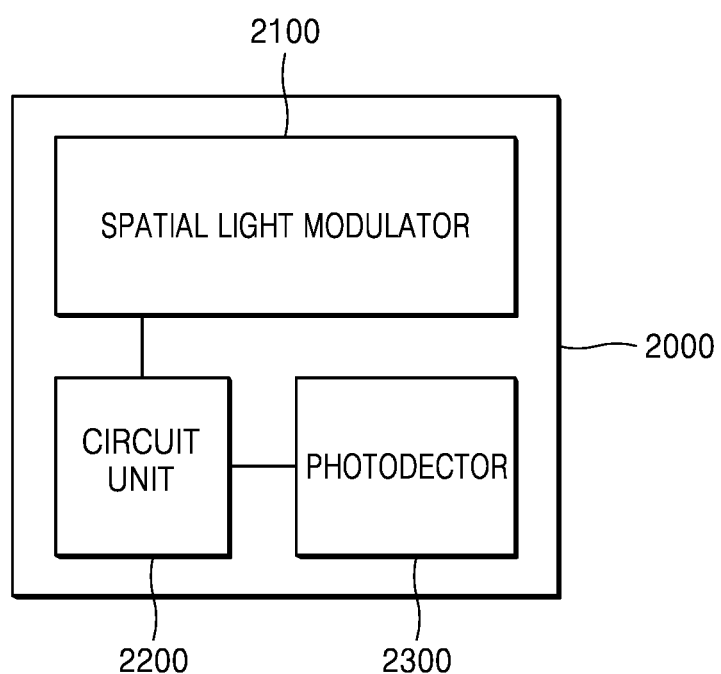
FIG. 11 schematically illustrates a beam steering apparatus including a spatial light modulator according to another example embodiment.

As illustrated in FIG. 11, a beam steering apparatus 2000 may include a spatial light modulator 2100 that controls a progression of the light, and a photodetector 2300 that detects the reflected light when the light of which progression direction is controlled is reflected by an object. The beam steering apparatus 2000 may further include a circuit unit 2200 connected to at least one of the spatial light modulator 2100 and the photodetector 2300. The circuit unit 2200 may include a component configured to acquire and calculate data and may further include a driver and a controller. In addition, the circuit unit 2200 may further include a power supply unit and a memory.

In FIG. 11, the beam steering apparatus 2000 includes the spatial light modulator 2100 and the photodetector 2300 as one device. However, the spatial light modulator 2100 and the photodetector 2300 may not be provided as one device but may be provided as separate devices. In addition, the circuit unit 2200 may be connected to the spatial light modulator 2100 or the photodetector 2300 not by wire, but by wireless communication. In addition, the configuration of FIG. 11 may be variously changed.

The spatial light modulator according to example embodiments described above may be applied to various systems. For example, the spatial light modulator may be applied to a Light Detection And Ranging (LiDAR) device. LiDAR devices may be phase-shifted or time-of-flight (TOF) devices. LiDAR devices may applied to self-driving cars, flying objects such as drones, mobile devices, moving devices (e.g., bicycles, motorcycles, strollers, boards, etc.), robots, human/animal assistance devices (e.g., canes, helmets, jewelry, clothing, watches, bags, etc.), Internet of Things (IoT) devices/systems, security devices/systems, and the like.

Figure 12:
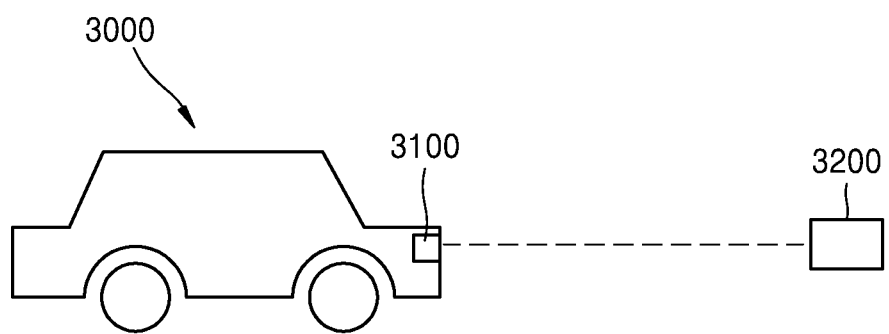
FIG. 12 is a side view illustrating an example in which a beam steering apparatus is applied to a vehicle light detection and ranging (LiDAR) according to an example embodiment.
Figure 13:
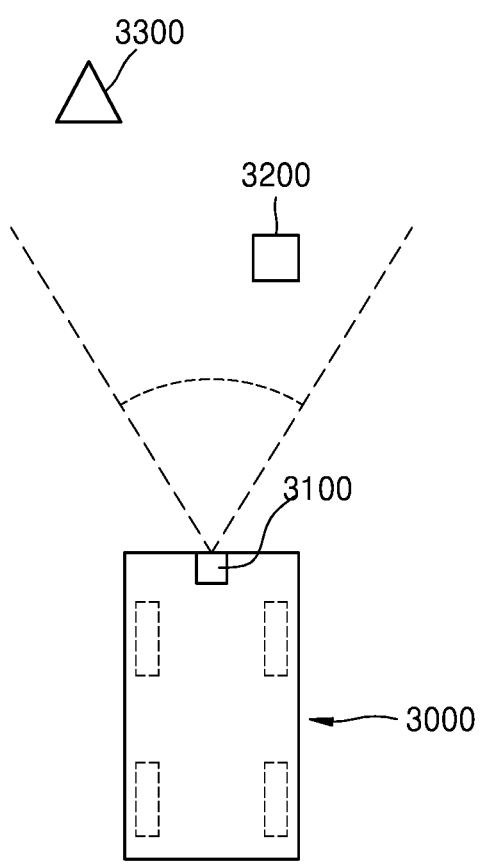
FIG. 13 is a plan view of an example in which the beam steering apparatus according to an example embodiment is applied to a vehicle LiDAR

FIGS. 12 and 13 are conceptual views illustrating a case where a LiDAR device including a beam steering apparatus according to an example embodiment is applied to a vehicle. FIG. 12 is a side view, and FIG. 13 is a top plan view of the conceptual views.

Referring to FIG. 12, a LiDAR device 3100 may be applied to a vehicle 3000, and information about a subject 3200 may be obtained using the LiDAR device 3100. The vehicle 3000 may be a vehicle having an autonomous driving function. The LiDAR device 3100 may detect the subject 3200 (e.g., an object or a person) in the direction in which the vehicle 3000 travels. In addition, the distance to the subject 3200 may be measured using information such as a time difference between the transmission signal and the detection signal. In addition, as illustrated in FIG. 13, information about a near subject 3200 and a far subject 3300 within a scan range may be acquired.

The beam steering apparatus according to various example embodiments of the disclosure may be applied to various systems in addition to LiDAR. For example, the beam steering apparatus according to various example embodiments may obtain three-dimensional information on a space and a subject through scanning, and thus, may be applied to a three-dimensional image acquisition apparatus or a three-dimensional camera. Also, the beam steering apparatus may be applied to holographic display apparatuses and structured light generating apparatuses. In addition, the beam steering apparatus may be applied to various optical devices such as a hologram generating device, a light coupling device, a variable focus lens, a depth sensor, and the like. In addition, the beam steering apparatus may be applied to various fields in which a meta surface or a meta structure is used. In addition, the spatial light modulator and the beam steering apparatus including the same according to the example embodiment of the disclosure may be applied to various applications in various optical and electronic devices fields.

The spatial light modulator according to the example embodiment may efficiently emit heat to the outside to facilitate temperature control and increase driving speed. Because the internal temperature of the spatial light modulator is efficiently controlled, crosstalk between pixels due to heat transfer may be reduced, and individual driving between pixels is facilitated, increasing the beam steering speed.

The beam steering apparatus according to the example embodiment may perform rapid beam scanning using a fast beam steering speed.

It should be understood that example embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:
1. A spatial light modulator comprising:
a substrate extending in a first direction;
a distributed Bragg reflector provided on the substrate;
a cavity provided on the distributed Bragg reflector;
a grating reflector provided on the cavity; and
heaters spaced apart from each other in the first direction and respectively arranged corresponding to pixels, the heaters being provided on the grating reflector and at a level higher than a level of the grating reflector with respect to the substrate, wherein a refractive index of the grating reflector is controlled by heat supplied from a corresponding heater, and a spacer layer provided between the heaters and the grating reflector, the spacer layer having a thickness in a range of 200 nm to 1000 nm.

2. The spatial light modulator of claim 1, wherein the spacer layer includes a dielectric.

3. The spatial light modulator of claim 2, wherein the spacer layer includes $SiO_2$.

4. The spatial light modulator of claim 1, wherein the grating reflector includes silicon.

5. The spatial light modulator of claim 1, wherein the heaters include at least one of W, TiN, and NiCr.

6. The spatial light modulator of claim 1, further comprising a trench provided between the heaters.

7. The spatial light modulator of claim 1, further comprising a trench reaching the spacer layer between the heaters.

8. A spatial light modulator comprising:
a substrate extending in a first direction;
a distributed Bragg reflector provided on the substrate;
a cavity provided on the distributed Bragg reflector;
a grating reflector provided on the cavity;
heaters spaced apart from each other in the first direction and respectively arranged corresponding to pixels, the heaters being provided on the grating reflector and at a level higher than a level of the grating reflector with respect to the substrate; and
a nanostructure provided between the substrate and the distributed Bragg reflector,
wherein a refractive index of the grating reflector is controlled by heat supplied from a corresponding heater.

9. The spatial light modulator of claim 8, wherein the nanostructure includes at least one of Si, Ge, SiGe, GaAs, $Si_3N_4$, $TiO_2$, GaP, and InSb.

10. A beam steering apparatus comprising:
a light source configured to irradiate light;
a spatial light modulator configured to control a progression direction of the light irradiated by the light source and irradiate the controlled light onto an object;
a photodetector for detecting light reflected from the object; and
a controller for controlling the spatial light modulator,
wherein the spatial light modulator comprises a substrate extending in a first direction, a distributed Bragg reflector provided on the substrate, a cavity provided on the distributed Bragg reflector, a grating reflector provided on the cavity, and heaters spaced apart from each other in the first direction and respectively arranged corresponding to pixels, the heaters being provided on the grating reflector and at a level higher than a level of the grating reflector with respect to the substrate,
wherein a refractive index of the grating reflector is controlled by heat supplied from a corresponding heater,
wherein a spacer layer provided between the heaters and the grating reflector, and
wherein the spacer layer has a thickness in a range of 200 nm to 1000 nm.

11. The beam steering apparatus of claim 10, wherein the grating reflector includes silicon.

12. The beam steering apparatus of claim 10, wherein the heaters comprise at least one of W, TiN, and NiCr.

13. The beam steering apparatus of claim 10, further comprising a trench provided between the heaters.

14. A spatial light modulator comprising:
a substrate extending in a first direction;
a distributed Bragg reflector provided on the substrate;
a cavity provided on the distributed Bragg reflector;
a grating reflector provided on the cavity; and
heaters spaced apart from each other in the first direction and respectively arranged corresponding to pixels, the heaters being provided on the grating reflector and at a level higher than a level of the grating reflector with respect to the substrate,
wherein a refractive index of the grating reflector is controlled by heat supplied from a corresponding heater, and
wherein the distributed Bragg reflector has a structure in which a first layer and a second layer are alternately stacked, the first layer and the second layer respectively including one of Si, $Si_3N_4$, $SiO_2$, and $TiO_2$.

15. A beam steering apparatus comprising:
a light source configured to irradiate light;
a spatial light modulator configured to control a progression direction of the light irradiated by the light source and irradiate the controlled light onto an object;
a photodetector for detecting light reflected from the object; and
a controller for controlling the spatial light modulator,
wherein the spatial light modulator comprises a substrate extending in a first direction, a distributed Bragg reflector provided on the substrate, a cavity provided on the distributed Bragg reflector, a grating reflector provided on the cavity, and heaters spaced apart from each other in the first direction and respectively arranged corresponding to pixels, the heaters being provided on the grating reflector and at a level higher than a level of the grating reflector with respect to the substrate,
wherein a refractive index of the grating reflector is controlled by heat supplied from a corresponding heater, and
wherein the distributed Bragg reflector has a structure in which a first layer and a second layer are alternately stacked, the first layer and the second layer respectively including one of Si, $Si_3N_4$, $SiO_2$, and $TiO_2$.

16. A beam steering apparatus comprising:
a light source configured to irradiate light;
a spatial light modulator configured to control a progression direction of the light irradiated by the light source and irradiate the controlled light onto an object;
a photodetector for detecting light reflected from the object;
a nanostructure provided between a substrate and a distributed Bragg reflector; and
a controller for controlling the spatial light modulator,
wherein the spatial light modulator comprises the substrate extending in a first direction, the distributed Bragg reflector provided on the substrate, a cavity provided on the distributed Bragg reflector, a grating reflector provided on the cavity, and heaters spaced apart from each other in the first direction and respectively arranged corresponding to pixels, the heaters being provided on the grating reflector and at a level higher than a level of the grating reflector with respect to the substrate, and
wherein a refractive index of the grating reflector is controlled by heat supplied from a corresponding heater.

17. The beam steering apparatus of claim 16, wherein the nanostructure includes at least one of Si, Ge, SiGe, GaAs, $Si_3N_4$, $TiO_2$, GaP, and InSb.

* * * * *